United States Patent [19]

Koyama et al.

[11] Patent Number: 5,029,261
[45] Date of Patent: Jul. 2, 1991

[54] APPARATUS FOR DETECTING POSITION OF LIGHT BEAM ON OBJECT SURFACE BY COMPARING DETECTION BEAMS SPLIT NEAR FOCAL POINT

[75] Inventors: Osamu Koyama, Kawasaki; Yasuo Nakamura, Musashino both of Japan

[73] Assignees: Canon Kabushiki Kaisha; Canon Denshi Kabushiki Kaisha, Tokyo, Japan

[21] Appl. No.: 262,724

[22] Filed: Oct. 26, 1988

[30] Foreign Application Priority Data

Oct. 29, 1987 [JP] Japan .............................. 62-271691

[51] Int. Cl.⁵ .................................................. G01J 1/20
[52] U.S. Cl. ................................. 250/201.5; 369/44.24
[58] Field of Search ..................... 250/201, 202, 201.5; 369/44, 46, 44.24

[56] References Cited

U.S. PATENT DOCUMENTS 4,504,938 3/1985 Tajima .................................. 369/46
4,682,315 7/1987 Uejima ......................... 250/201 DF
4,682,316 7/1987 Tateoka et al. .............. 250/201 DF
4,841,509 6/1989 Kamisada et al. ..................... 369/46

Primary Examiner—David C. Nelms
Attorney, Agent, or Firm—Fitzpatrick, Cella, Harper & Scinto

[57] ABSTRACT

A light beam position detecting apparatus includes a light source and a first optical system for focusing a light beam emitted from the light source onto an object surface. The object surface has an optically unidirectional structure on the order of a size of a light spot formed by the light beam, and a second optical system focuses a detection beam transmitted through or reflected by the object surface. In addition, an optical element, disposed near a focal point of the detection beam, splits the detection beam, photosensors receive the beams split by the optical element, and a processor calculates a difference between outputs from the photosensors and detects a position of the light beam incident on the unidirectional structure.

8 Claims, 5 Drawing Sheets

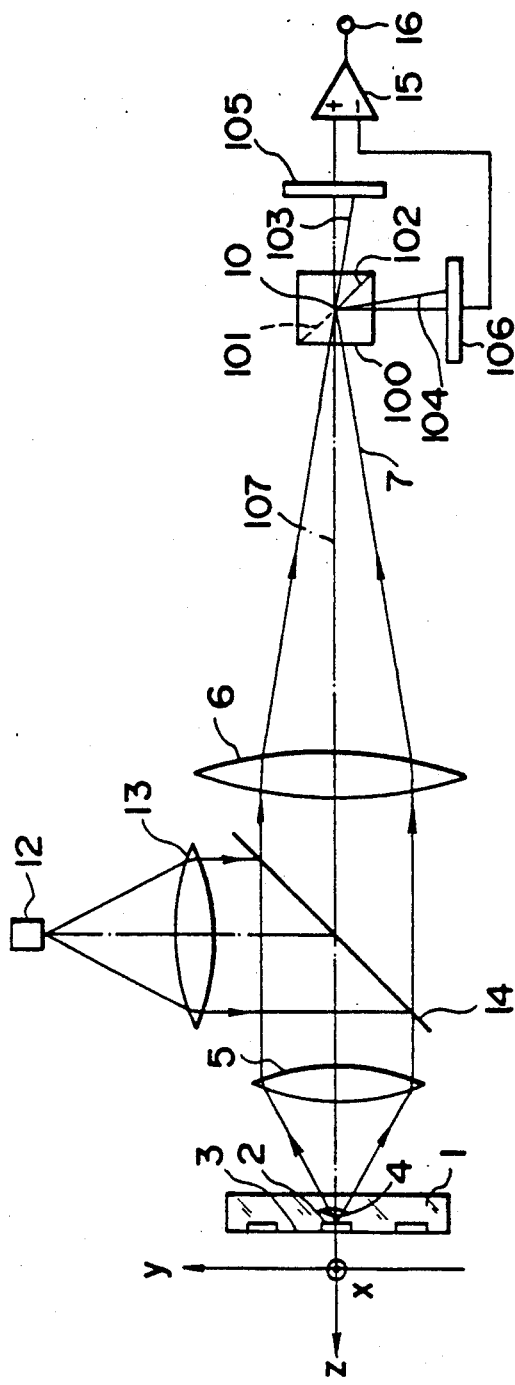
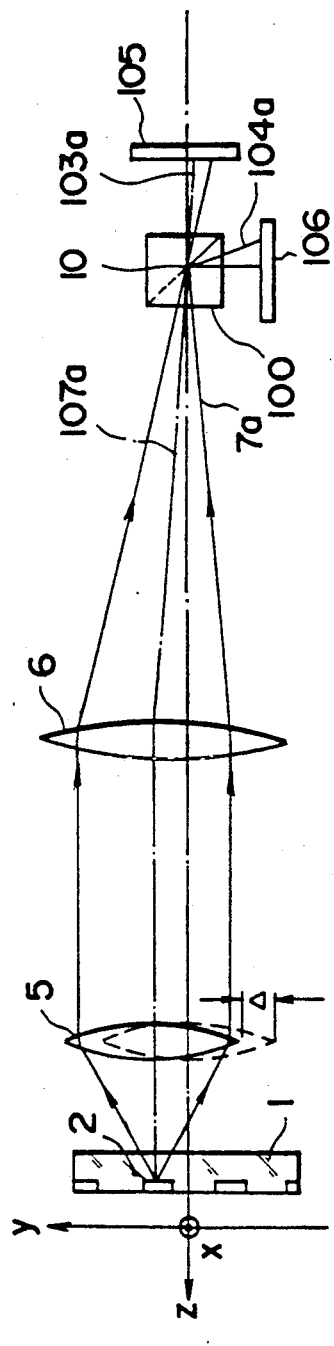
FIG. 4
FIG. 5

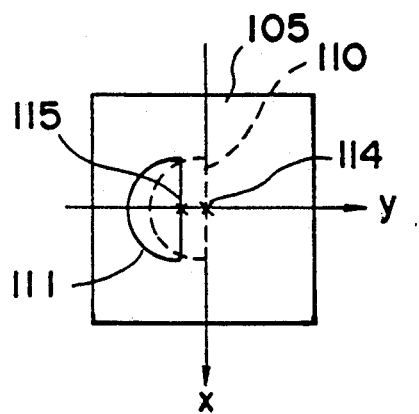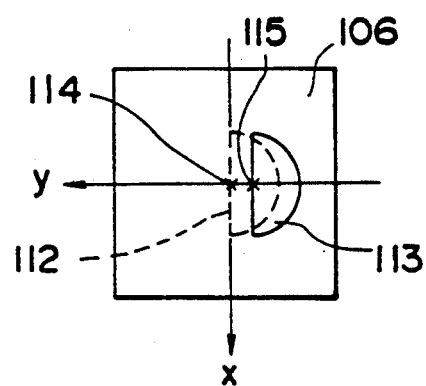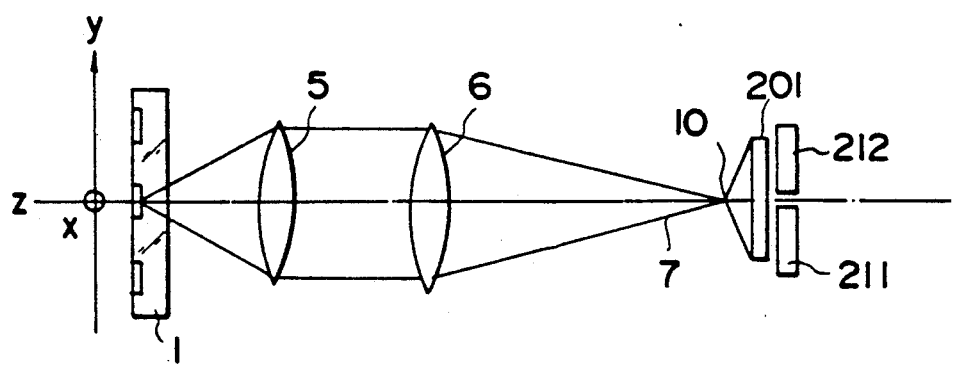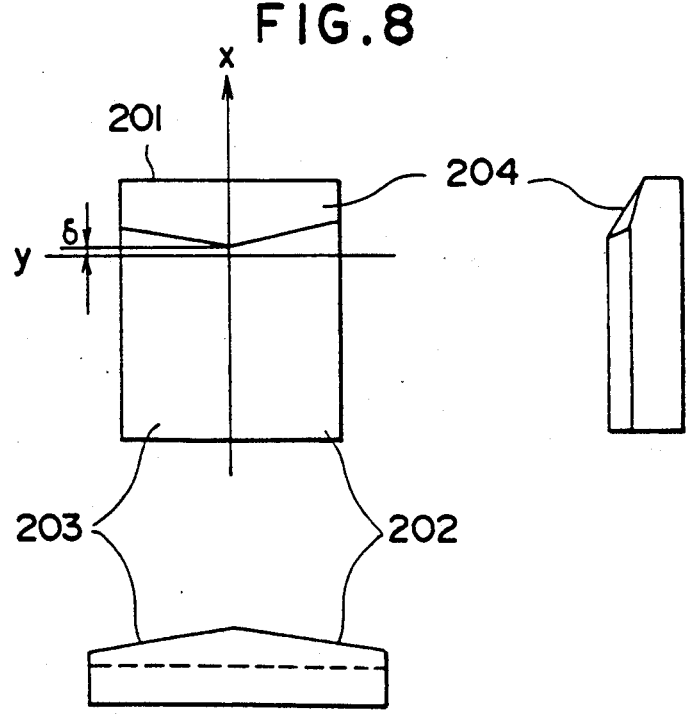

APPARATUS FOR DETECTING POSITION OF LIGHT BEAM ON OBJECT SURFACE BY COMPARING DETECTION BEAMS SPLIT NEAR FOCAL POINT

BACKGROUND OF THE INVENTION

1. Field of the Invention

The present invention relates to a light beam position detecting apparatus and, more particularly, to an apparatus for detecting a planar position of a light beam emitted on an object surface having an optically unidirectional structure such as a track of an optical disk.

2. Related Background Art

A push-pull method is known as a conventional method of controlling a position of an object surface irradiated with a light beam (this control method is referred to tracking hereinafter) in an information recording/reproduction apparatus using an optical recording medium such as an optical disk or an optical card.

Tracking by a push-pull method used in an optical disk apparatus will be described below.

FIG. 1 is a schematic view showing an optical system for explaining tracking by a push-pull method.

Referring to FIG. 1, an optical disk 1 has lands 2 and grooves 3, both of which are formed on an information recording/reproduction surface (to be referred to as an information surface hereinafter). The lands 2 and the grooves 3 constitute tracks. The optical system includes an objective lens 5, a condenser lens 6, and two-split sensor elements 8 and 9. A light beam emitted from a light source (not shown) is focused by the objective lens 5 on the information surface to form a beam spot 4. The light spot 4 is diffracted and reflected by the land 2 and the groove 3 which have unidirectivity in the x direction. The reflected beam is incident again on the objective lens 5 and is converted by the condenser lens 6 into detection light beams 7 which are then incident on the sensor elements 8 and 9. In this case, the two-split sensor elements 8 and 9 are located at a far-field position different from an image point 10 serving as a focal point.

FIGS. 2A to 2C are views showing light intensity distributions of the two-split sensor elements 8 and 9 when the optical disk 1 is moved in the y direction in FIG. 1. More specifically, FIG. 2A shows a light intensity distribution when the beam spot 4 is located between the groove 3 and the land 2, FIG. 2B shows a light intensity distribution when the beam spot 4 is located on the land 2. FIG. 2C shows a light intensity distribution when the beam spot 4 is located between the land 2 and the groove 3 oppositely to the y direction.

A hatched portion of a light beam 11 on the two-split sensor element 9 in FIG. 2A and a hatched portion of a light beam 11 on the two-split sensor element 8 in FIG. 2C have lower light intensities than those of other portions. If outputs from the two-split sensor elements 8 and 9 are defined as S1 and S2, respectively, a difference signal (S1−S2) is given as S1−S2>0 (A in FIG. 3) in FIG. 2A, S1=S2 (B in FIG. 3) in FIG. 2B, and S1−S2<0 (C in FIG. 2C. A difference signal shown in FIG. 3 is normally called a track error signal. The positional relationship between the land 2 and the spot 4 can be detected in accordance with this difference signal. The objective lens 5 is driven in a direction perpendicular to the optical axis so that (S1−S2) becomes zero, thereby accurate tracking may be performed.

The above push-pull method has the following problem. For example, assume that the objective lens 5 is driven in the y direction of FIG. 1 to control the beam spot 4 on a target track. Upon movement of the objective lens 5 in the y direction, the light beams 11 on the two-split sensor elements 8 and 9 are moved in the y direction (although not illustrated). Since a sensor output difference (S1−S2) is also changed upon movement of the light beams, a change in light intensity distribution upon movement of the light beam cannot be distinguished from that upon relative movement between the light beam and the track. This results in an offset of the tracking error signal, and accurate tracking cannot be performed. The above phenomenon also occurs when disturbance such as inclination of the optical disk 1 is effected in a tracking system, thus degrading stability and reliability of the tracking system.

SUMMARY OF THE INVENTION:

It is an object of the present invention to provide a light beam position detecting apparatus which can solve the conventional problems, is free from influences of movement of a light beam and inclination of an object surface, and can always perform accurate, stable positional detection.

In order to achieve the above object of the present invention, there is provided a light beam position detecting apparatus comprising: a light source; means for focusing a light beam emitted from the light source onto an object surface, the object surface having an optically unidirectional structure on the order of a size of a light spot formed by the light beam; means for focusing a detection beam transmitted through or reflected by the object surface; an optical element, disposed near a focal point of the detection beam, for partially splitting the detection beam into a split beam extending in a longitudinal direction of a projected unidirectional structure; photosensors for receiving beams split by the optical element and means for calculating a difference of outputs from the photosensors and detecting a position of the light beam incident on the unidirectional structure.

In the apparatus having the arrangement described above, a change in light intensity distribution of the detection beam by deviation of the light beam from the track can be detected as a difference between detection signals from the plurality of photosensors. This is because the detection beams are split and substantially coincide with the longitudinal direction of the track image.

Movement of the detection beam by movement or the like of the objective lens does not adversely affect the detection signals from the photosensors if the radiation beam is located on the track due to the following reason. Since the detection beam is split and detected near the focal point, movement of the detection beams causes movement of the split beams on the light-receiving surfaces of the photosensors so that the amount of the beams received on the light-receiving surfaces is not changed.

In this manner, the change in light intensity distribution of the detection beam can be detected from the output signals from the photosensors regardless of movement of the detection beam.

BRIEF DESCRIPTION OF THE DRAWINGS

FIG. 4 is a schematic view showing an optical information recording/reproducing apparatus according to a first embodiment of the present invention;

FIG. 5 is a schematic view showing an optical detection system for explaining movement of detection light beams when an objective lens is moved in the apparatus in FIG. 4;

FIGS. 6A and 6B are views showing moving states of light beams on the two sensors shown in FIG. 4;

FIG. 7 is a schematic view showing an optical system of an optical information recording/reproducing apparatus according to a second embodiment of the present invention;

FIG. 8 shows a beam splitting element used in the apparatus of FIG. 7 when viewed from the front, top, and side thereof;

DETAILED DESCRIPTION OF THE PREFERRED EMBODIMENTS

Figure 1:
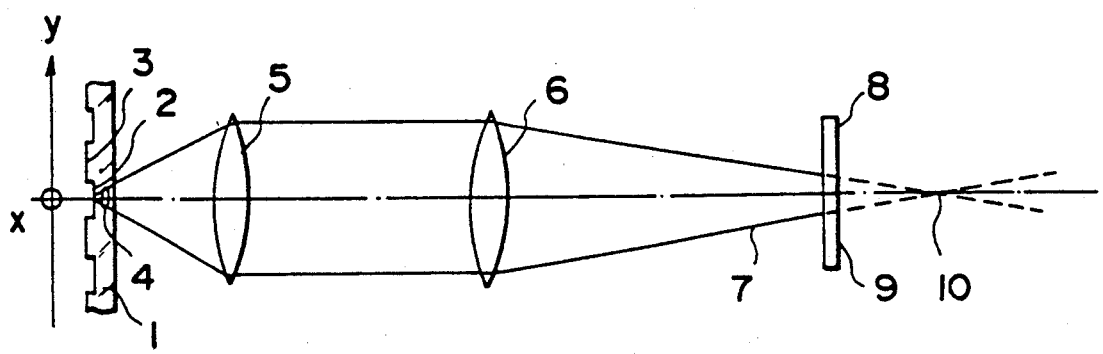
FIG. 1 is a schematic view of an optical system of an optical information recording/reproducing apparatus so as to explain tracking according to a conventional push-pull method.
Figure 2A:
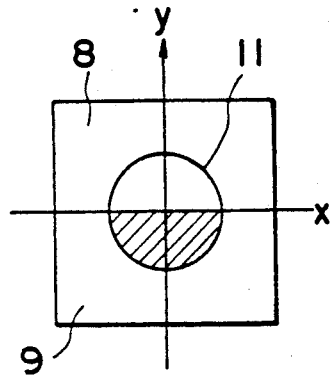
FIGS. 2A to 2C are views showing changes in light intensity distributions on the two-split sensor elements when an optical disk is moved in the y direction in FIG. 1.
Figure 2B:
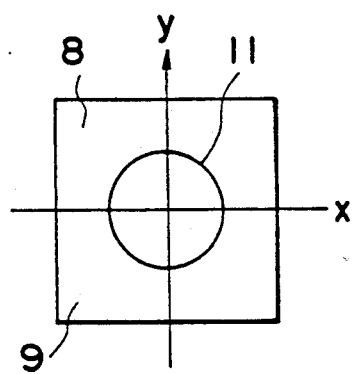
Figure 2C:
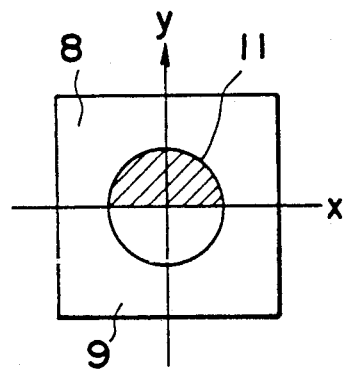

Preferred embodiments of the present invention will be described in detail with reference to the accompanying drawings.

A light beam position detecting apparatus according to the present invention is applied to tracking in an optical information recording/reproducing apparatus but is not limited thereto.

FIG. 4 is a schematic view showing an optical information recording/reproducing apparatus according to an embodiment of the present invention.

Referring to FIG. 4, a light beam emitted from a light source 12 such as a semiconductor laser is collimated by a collimator lens, reflected by a beam splitter 14, and directed toward an objective lens 5. The objective lens 5 focuses the light beam onto an optical disk 1 to form a beam spot 4 thereon. The optical disk 1 has an optical unidirectional structure on the order of a size of the beam spot 4, that is, a track. Each track is constituted by a groove 3 extending in the x direction and a land 2, i.e., an area between the adjacent grooves.

A detection beam 7 reflected by the optical disk 1 passes through the objective lens 5 again and is focused on an image point 10 by a condenser lens 6 through a beam splitter 14. The detection beam 7 is incident on a beam splitting element 100.

Figure 3:
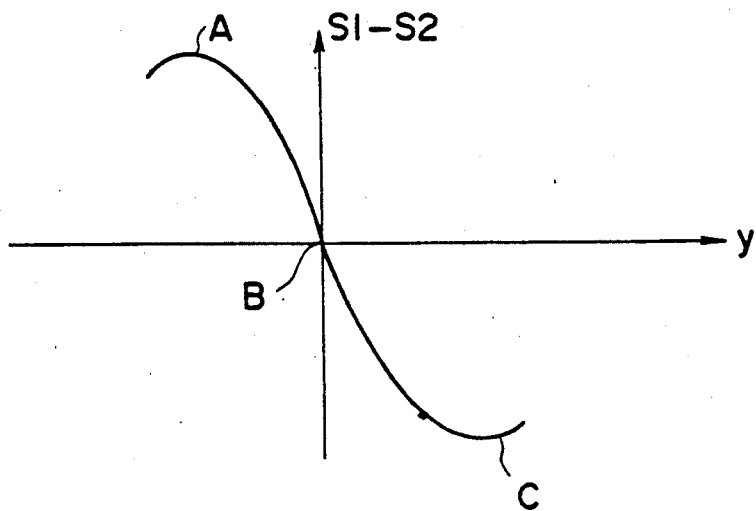
FIG. 3 is a graph showing a characteristic curve showing a difference signal from the two-split sensor elements in the apparatus shown in FIG. 1.

As shown in FIG. 4, the beam splitting element 100 is located near the image point 10 on a principal ray 107 of the detection beam 7. The beam splitting element 100 comprises a transmitting portion 101 in a positive direction of the y-axis and a reflecting portion 102 in a negative direction of the y-axis. The beam splitting element 100 splits the detection beam 7 into divergent beams 103 and 104. If the principal ray 107 of the detection beam 7 is located on the boundary between the transmitting portion 101 and the reflecting portion 102, the divergent beams 103 and 104 in the positive and negative directions of the y-axis with respect to the principal ray 107 are incident on sensors 105 and 106, respectively. Outputs from the sensors 105 and 106 are differentially amplified by a differential amplifier 15, and a tracking error signal similar to that in FIG. 3 appears at a terminal 16.

A tracking error signal obtained by displacing the objective lens 5 in the positive direction of the y-axis by a displacement Δ so as to follow the track of the optical disk will be described below.

FIG. 5 is a schematic view of an optical detection system in the apparatus of FIG. 1 so as to explain movement of the detection beam when the objective lens is moved.

Referring to FIG. 5, the detection beam 7 is moved in the y direction upon movement of the objective lens 5 (the position prior to movement is represented by a broken line) and becomes a detection beam 7a. In this case, the principal ray 107 of the detection beam 7 is moved accordingly and becomes a principal ray 107a. The detection beam 7a is split into components by the beam splitting element 100 located near the image point 10. These components form split beams which intersect with the principal ray 107a and are guided to the sensors 105 and 106, respectively. Therefore, the beams 103 and 104 in FIG. 4 are moved in the negative directions of the y-axis and the z-axis and become light beams 103a and 104a, respectively. However, if the sensors 105 and 106 have sizes large enough to cover the displacements of the light beams 103 and 104, the displacements are not detected as signals.

FIGS. 6A and 6B are views showing distributions indicating moving states of the light beams on the sensors 105 and 106.

Referring to FIGS. 6A and 6B, light beams 110 and 112 represented by broken lines are obtained when the objective lens 5 is not moved, while light beams 111 and 113 represented by solid lines ar obtained when the objective lens is moved by a displacement Δ. In this case, the principal ray 107 prior to movement of the objective lens and the principal ray 107a after movement of the objective lens are located at positions 114 and 115, respectively, in FIGS. 6A and 6B.

The x- and y-axes in FIGS. 6A and 6B are the x- and y-axes (in FIG. 4 and FIG. 5) projected on the sensors 105 and 106. A ratio of light intensities of the beams split in the positive and negative directions of the y-axis is changed in accordance with a change in position of the radiation beam relative to the land 2. A difference between signal outputs from the sensors 105 and 106 is detected to obtain a tracking error signal. At this time, movement of light beams is not detected as a signal, as is apparent from FIGS. 6A and 6B. Therefore, unlike in the conventional technique, an offset of the tracking error signal is not generated.

Even if the light beam is moved by disturbance such as inclination of an optical disk or the like other than movement of the objective lens, the beam splitting element is located near the image point conjugate with the object point according to the present invention, and therefore the disturbance does not adversely affect tracking.

FIG. 7 is a schematic view showing only an optical detection system of an optical information recording-/reproducing apparatus according to a second embodiment of the present invention. Other arrangements of the second embodiment are the same as those of the first embodiment.

FIG. 8 shows a beam splitting element used in the apparatus of FIG. 7 when viewed from the front, top, and side thereof. This embodiment is a combination of a focus detection apparatus disclosed in pending U.S. Ser. No. 425,355 (filed on Sept. 1, 1987) and the present invention. Accurate focus detection and tracking error detection can be simultaneously performed.

As shown in FIG. 7, a beam splitting element 201 is a transmitting element having a roof-like inclined surface. A detection beam 7 is split by the element 201 and the split components reach tracking error detection sensors 211 and 212. Referring to FIG. 8, the x- and y-axes are obtained by projecting the x- and y-axes of FIG. 7. The beam splitting element 201 includes tracking error signal detection beam splitting surfaces 202 and 203 and a focus detection beam splitting surface 204. In the same manner as described with reference to the first embodiment, when the center of the spot (spot size: 26) of the image point 10 is located at the intersection between the x- and y-axes and the object point and the image points are located near conjugate points, the detection beam 7 is split by the splitting surfaces 202 and 203 into crescent beams 213 and 214 shown in FIG. 11. These beams 213 and 214 are incident on the tracking error detection sensors 211 and 212, respectively. A subsequent means for obtaining the tracking error signal is the same as those in FIG. 4, and a detailed description thereof will be omitted.

Figure 11:
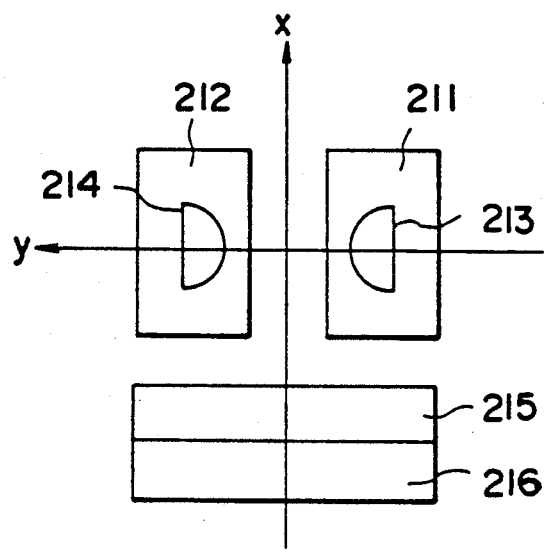
FIG. 11 is a view showing a moving state of the beam on the tracking error detection sensor.

The behavior of the light beam and the tracking error signal by the disturbance such as movement of the objective lens in this embodiment is the same a that described with reference to the first embodiment. Sensors 215 and 216 shown in FIG. 11 are focus detection sensors, respectively. A focus detection method is described in detail in pending U.S. Ser. No. 425,355 described above, and an operation thereof will be briefly described.

Figure 9A:
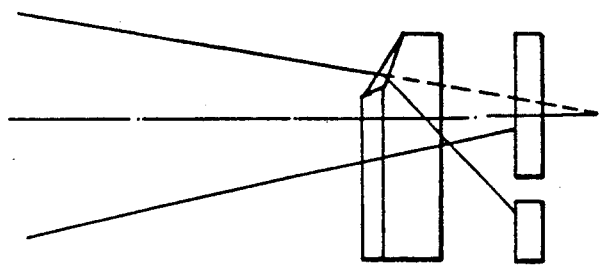
FIGS. 9A to 9C are schematic views showing changes in focusing states near the beam splitting element shown in FIG. 8.
Figure 9B:
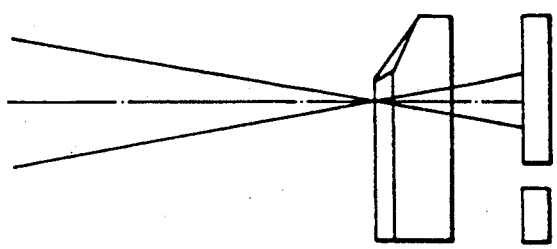
Figure 9C:
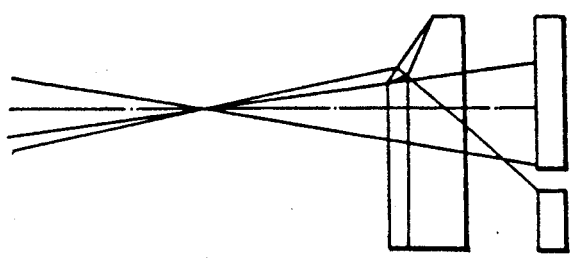

FIGS. 9A to 9C are schematic views showing focusing states near the beam splitting element 201. More specifically, FIG. 9A shows a focusing state wherein the light beam is focused behind the object surface, FIG. 9B shows a focusing state wherein the light beam is focused on the object surface, and FIG. 9C shows a focusing state wherein the light beam is focused before the object surface.

Figure 10A:
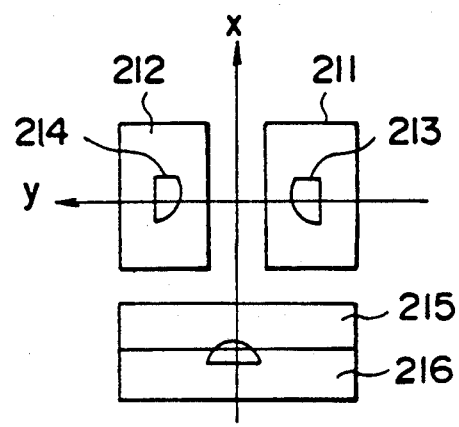
FIGS. 10A to 10C are views for explaining light beams formed on a tracking error detection sensor and a focus detection sensor so as to correspond to the views of FIGS. 9A to 9C, respectively.
Figure 10B:
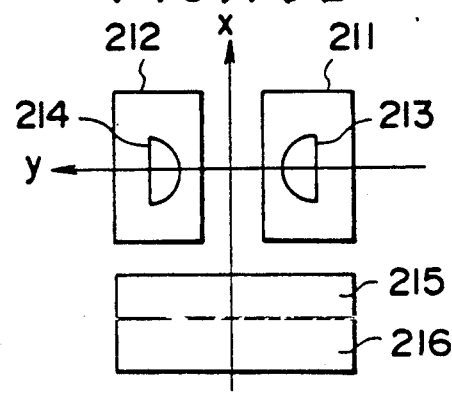
Figure 10C:
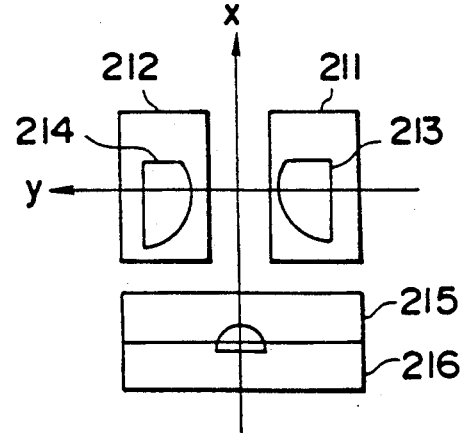

FIGS. 10A to 10C are views for explaining light beams formed on the tracking error detection sensors and the focus detection sensors so as to correspond to the states of FIGS. 9A to 9C.

As shown in FIG. 10A, when the light beam is focused behind the object surface, part of the detection beam is refracted by the splitting surface 204 and is incident on the focus detection sensors 215 and 216. In this case, an amount of light received by the focus detection sensor 216 is larger than that of the focus detection sensor 215.

As shown in FIG. 10B, when the light beam is focused on the object surface, no detection beam is incident on the focus detection sensors 215 and 216.

As shown in FIG. 10C, when the light beam is focused before the object surface, part of the detection beam is received by the focus detection sensors 215 and 216. In this case, an amount of light received by the focus detection sensor 215 is larger than that of the focus detection sensor 216.

Another beam splitting element and sensor used in the present invention and its application will be described with reference to FIGS. 12 and 13. This arrangement is used in place of the beam splitting element and the sensors in the second embodiment described with reference to FIGS. 7 to 11.

Figure 12:
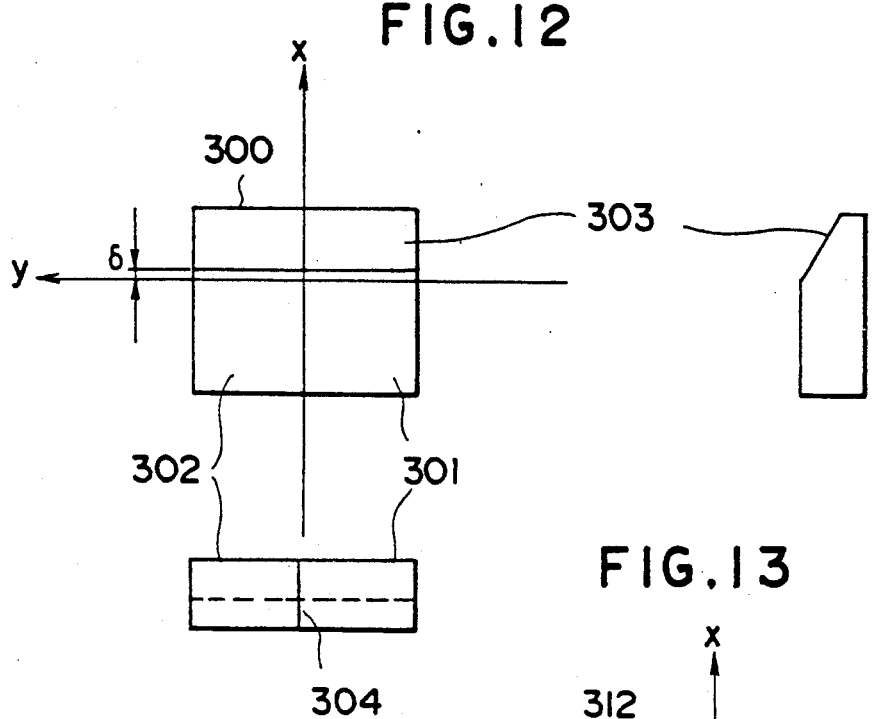
FIG. 12 shows another beam splitting element when viewed from the front, top, and side thereof.
Figure 13:
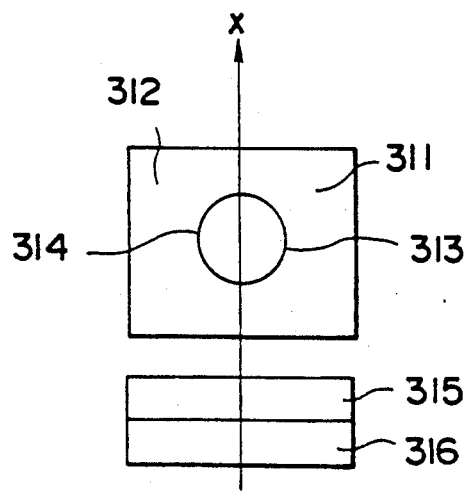
FIG. 13 is a view showing a distribution of the light beam on the tracking error detection sensor when the element in FIG. 12 is used.

As described in the second embodiment, a beam splitting element is located such that a principal ray is incident on the intersection between the x- and y-axes in FIG. 12. The beam splitting element includes tracking error detection beam incident surfaces 301 and 302 and a focus detection beam splitting surface 303. A surface 304 serves as a beam reflecting surface and is located to coincide with the boundary line between the beam incident surfaces 301 and 302. When the objective lens is not moved, the beam reflecting surface 304 does not reflect the light beam incident on the beam splitting element, and the incident light becomes light beams 314 and 313 shown in FIG. 13. The beams 314 and 313 are incident on the tracking error signal detection sensors 312 and 311, respectively. Sensors 315 and 316 serve as focus detection sensors, respectively.

When disturbance such as movement of the objective lens occurs, since the reflecting surface 304 is divided at the image point 10 with respect to the principal ray, the same effect as in the first embodiment can be obtained.

In the light beam position detecting apparatus according to the present invention, as has been described above, a simple optical element called a beam splitting element is arranged to detect a change in light intensity distribution of the detection beam upon a relative positional change between the optical surface and the light beam in accordance with detection signals from the photosensors regardless of movement of the detection beam. Therefore, information of the relative position between the optical surface and the light beam can be accurately detected.

The present invention can be suitably applied to an optical information recording/reproducing apparatus to constitute an optical information recording/reproducing apparatus which is free from offset in the tracking error signal.

What is claimed is:

1. An optical information recording/reproducing apparatus, comprising:
   a light source;
   a lens system for converging a light beam emitted from said light source on a track of a recording medium within a certain plane;
   means for focusing a detection beam, having an optical axis, transmitted through or reflected by the recording medium, the detection beam forming an image of the track;
   an optical element having an edge portion disposed substantially near or at a focal point of the detection beam and being parallel with a longitudinal direction of the image of the track, said optical element splitting the detection beam into a first beam passing through one side of said edge portion and a second beam passing through another side of said edge portion;

first and second photosensors for receiving the first and second beams, respectively; and a circuit for calculating a difference between outputs of said first and second photosensors and detecting a position of the irradiated light beam relative to the track, wherein said edge portion enables said first and second photosensors to receive a constant quantity of light, regardless of whether the optical axis of the detection beam is moved in the direction perpendicular to the longitudinal direction of the track.

2. An apparatus according to claim 1, wherein said optical element includes a discrete mirror having a reflecting surface and being disposed such that said reflecting surface is inclined with respect to the optical axis of the detection beam, and wherein an end surface of said mirror comprises said edge portion.

3. An apparatus according to claim 1, wherein said optical element comprises a Fresnel's biprism, wherein a ridgeline in said prism comprises said edge portion and is parallel with the longitudinal direction of the image of the track.

4. An apparatus according to claim 3, wherein said prism has an inclined surface extending in a plane that is transverse to the plane of the recording medium so that a part of the detection beam is refracted to detect a focus error signal of the irradiated light beam.

5. An apparatus according to claim 4, further comprising a third photosensor having a light receiving surface which is divided in the longitudinal direction of the image of the track so as to receive the light beam deflected by said inclined surface.

6. An apparatus according to claim 1, wherein said optical element comprises a transparent plate which includes a mirror having reflecting surfaces parallel with an optical axis of the detection beam and in which an end surface of said mirror comprises said edge portion and is parallel with the longitudinal direction of the image of the track.

7. An apparatus according to claim 6, wherein said transparent plate has an inclined surface extending in a plane that is transverse to the plane of the recording medium so that a part of the detection beam is refracted to detect a focus error signal of the irradiated light beam.

8. An apparatus according to claim 7, further comprising a third photosensor having alight receiving surface which is divided in he longitudinal direction of the image of the track so as to receive the light beam deflected by said inclined surface.

* * * * *

UNITED STATES PATENT AND TRADEMARK OFFICE
CERTIFICATE OF CORRECTION

PATENT NO. : 5,029,261
DATED : July 2, 1991
INVENTOR(S) : Osamu Koyama, et al.

It is certified that error appears in the above-identified patent and that said Letters Patent is hereby corrected as shown below:

ON THE TITLE PAGE

In the addresses of the Assignees, "Tokyo, Japan" should read --Tokyo, Japan and Chichibu-shi, Japan, respectively--.

IN THE DISCLOSURE

COLUMN 2

Line 22, "INVENTION:" should read --INVENTION--.

COLUMN 4

Line 53, "ar" should read --are--.

COLUMN 5

Line 33, "(spot size: 26)" should read --(spot size: 2$\phi$)--.

UNITED STATES PATENT AND TRADEMARK OFFICE
CERTIFICATE OF CORRECTION

PATENT NO. : 5,029,261

DATED : July 2, 1991

INVENTOR(S) : Osamu Koyama, et al.

It is certified that error appears in the above-identified patent and that said Letters Patent is hereby corrected as shown below:

COLUMN 8

Line 25, "alight" should read --a light--; and
    Line 26, "in he" should read --in the--.

Signed and Sealed this

Twenty-third Day of February, 1993

Attest:

STEPHEN G. KUNIN

*Attesting Officer*      *Acting Commissioner of Patents and Trademarks*